United States Patent
Guo et al.

(10) Patent No.: US 10,713,598 B2
(45) Date of Patent: Jul. 14, 2020

(54) ANTICIPATING USER DISSATISFACTION VIA MACHINE LEARNING

(71) Applicant: Uber Technologies, Inc., San Francisco, CA (US)

(72) Inventors: Fei Guo, Sunnyvale, CA (US); Shiyun Huang, San Francisco, CA (US); Dajiang Wei, Burlingame, CA (US)

(73) Assignee: Uber Technologies, Inc., San Francisco, CA (US)

( * ) Notice: Subject to any disclaimer, the term of this patent is extended or adjusted under 35 U.S.C. 154(b) by 761 days.

(21) Appl. No.: 15/253,394

(22) Filed: Aug. 31, 2016

(65) Prior Publication Data
US 2018/0060754 A1    Mar. 1, 2018

(51) Int. Cl.
*G06Q 10/00* (2012.01)

(52) U.S. Cl.
CPC .................... *G06Q 10/00* (2013.01)

(58) Field of Classification Search
None
See application file for complete search history.

(56) References Cited

U.S. PATENT DOCUMENTS

| | | | |
|---|---|---|---|
| 10,067,990 B1 * | 9/2018 | Boothman | G06F 16/248 |
| 2017/0200321 A1 * | 7/2017 | Hummel | G06Q 30/0609 |
| 2017/0220933 A1 * | 8/2017 | Gonguet | G06N 20/00 |
| 2017/0364933 A1 * | 12/2017 | Chen | G06Q 10/04 |
| 2018/0018684 A1 * | 1/2018 | Orr | G06Q 30/0202 |

FOREIGN PATENT DOCUMENTS

| | | | |
|---|---|---|---|
| CN | 104504460 A | * | 4/2015 |
| JP | 2005018697 A | * | 1/2005 |

OTHER PUBLICATIONS

Chenxiang Li, https://github.com/alichenxiang/udacity-predicting-uber-rider-retention/blob/master/Capstone%20Project%20Report.pdf, accessed May 8, 2019, uploaded Aug. 30, 2016 (Year: 2016).*
Idaewor, Patricia Fatima Renua. "Transport user satisfaction modelling-Application to the brokerage vehicle selection process." PhD diss., University of London, 2005. (Year: 2005).*

* cited by examiner

*Primary Examiner* — Alexey Shmatov
*Assistant Examiner* — Casey R. Garner
(74) *Attorney, Agent, or Firm* — Fenwick & West LLP

(57) ABSTRACT

A server of a transportation network determines characteristics of trips provided to users, as well as the usage of the services by users. Using the determined characteristics, the server trains a model that, for a given set of trips for a user, estimates a degree of likely user dissatisfaction with the trips. Based on the estimated degree of user dissatisfaction, the system can estimate user dissatisfaction in real time, directly after completion of a trip, and can take remedial actions should the user be estimated to be likely dissatisfied.

16 Claims, 3 Drawing Sheets

ANTICIPATING USER DISSATISFACTION VIA MACHINE LEARNING

FIELD OF ART

The present disclosure generally relates to the field of machine learning, and more specifically, to estimating degrees to which users are dissatisfied with their experiences with a transportation network.

BACKGROUND

The quality of a particular ride or other transportation activity provided by service providers of a transportation network influences the degree of affinity that the users of the network feel for the network. In extreme cases of poor transportation quality, certain users may feel prompted to cease using the network's transportation services, either indefinitely or for a prolonged period of time. It would be desirable in such cases for the transportation network to be able to contact the users in order to address the problem. Unfortunately, it is difficult to formulate a set of ad hoc rules that accurately capture the variety and subtle interactions of different factors that influence the users' perceptions of the quality of the transportation, and it is even more difficult to determine when a particular user will be in danger of ceasing to use the transportation network's services.

SUMMARY

Examples provided herein describe a system to identify users who may be likely to cease use of the system or its network service. In some examples, the system can correspond to or be a part of a service arrangement system that provides a platform or network service to enable users to request location-based services using their respective computing devices and to select service providers to provide the requested services. In order to be able to more precisely predict users that are likely to cease use of the system, and in order to eliminate the need for system analysts to spend time and significant resources manually examining user data to make such predictions, examples described herein provide a system that automatically computes scores or values for users based on trained models, and that trains the models without the need for manual creation of training sets.

A system can use historical data of location-based services that were previously completed as well as other data, such as whether or not users that received such location-based services continued to use the network service after a duration of time, to develop and train the model using a machine learning algorithm. For example, the system can determine which users ceased using the network service for a duration of time after the last respective completed trips, and identify training sets of trip sequences of those trips. Depending on implementation, examples of the training sets can include a positive training set of trip sequences of one or more trips associated with the user that preceded the user ceasing to use the transportation services, and a negative training set of trip sequences of one or more trips associated with the user that did not precede the user ceasing to use the transportation services. For an individual user, the system can determine, using the trained model and trip features of a set of previously completed trips (and/or their respective satisfaction scores) for that user to determine whether that user may be likely to cease using the network service. For such identified users, the system can perform one or more remedial actions in an attempt to encourage such users to continue to use the network service. As an addition or an alternative, the system can also monitor an ongoing trip for a user (or analyze the trip after its completion) to determine the user's dissatisfaction score for that trip.

According to some examples, a computer-implemented method performed by a computing system (e.g., one or more servers) comprises determining characteristics of trips of a plurality of users of the transportation service; determining, after completion of the trips, a set of users of the plurality of users that have ceased using the transportation services for at least a threshold period of time after the completion; identifying, for each user of the set of users, at least a first training set of trip sequences of one or more trips associated with the user that preceded the user ceasing to use the transportation services and a second training set of trip sequences of one or more trips associated with the user that did not precede the user ceasing to use the transportation services; determining trip features for trips of the first training set of trip sequences and for trips of the second training set of trip sequences; training a prediction model by providing the determined trip features as input to a supervised machine learning algorithm; for a first user, determining a first set of trip features of a set of previous trips of the first user; computing a first user dissatisfaction score for the first user by providing the first set of trip features as input to the prediction model; determining that the first user dissatisfaction score indicates that user is dissatisfied with the set of previous trips; and responsive to determining that the first user dissatisfaction score indicates that user is dissatisfied with the set of previous trips, performing a remedial action with respect to the first user.

In one embodiment, a computer-implemented method comprises determining characteristics of trips of a plurality of users of a transportation service; determining, after completion of the trips, a set of users of the plurality of users that have ceased using the transportation services for at least a threshold period of time after the completion; training a prediction model based on trip sequences associated with users who have ceased using the transportation services for at least the threshold period of time; obtaining a first user dissatisfaction score for the first user using the prediction model and a recent set of trips for the first user; determining that the first user dissatisfaction score indicates that user is dissatisfied with the recent set of trips; and responsive at least in part to determining that the first user dissatisfaction score indicates that user is dissatisfied with the recent set of trips, performing a remedial action with respect to the first user.

In one embodiment, a non-transitory computer-readable storage medium stores instructions executable by a processor, the instructions comprising: instructions for determining characteristics of trips of a plurality of users of a transportation service; instructions for determining, after completion of the trips, a set of users of the plurality of users that have ceased using the transportation services for at least a threshold period of time after the completion; instructions for training a prediction model based on trip sequences associated with users who have ceased using the transportation services for at least the threshold period of time; instructions for obtaining a first user dissatisfaction score for the first user using the prediction model and a recent set of trips for the first user; instructions for determining that the first user dissatisfaction score indicates that user is dissatisfied with the recent set of trips; and instructions for, responsive at least in part to determining that the first user dissatisfaction score indicates that user is dissatisfied with the recent set of trips, performing a remedial action with respect to the first user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following description that alternative embodiments of the structures and methods illustrated herein may be employed without departing from the examples described herein.

DETAILED DESCRIPTION

Figure 1:
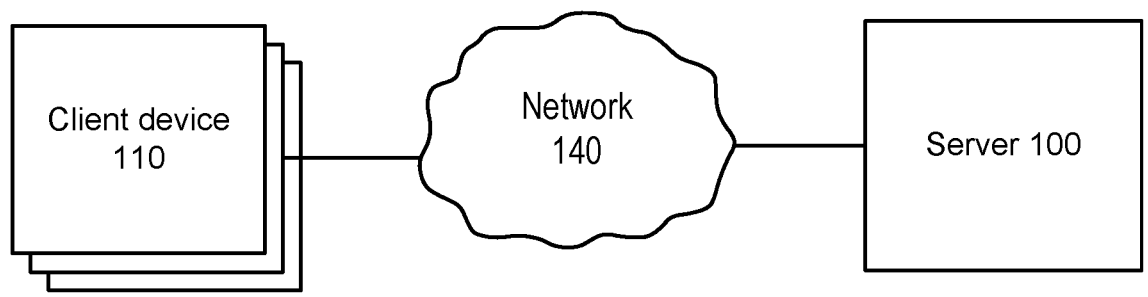
FIG. 1 illustrates a detailed view of an environment in which users use their client devices interact with a server, such as to conduct transactions with a company or other organization responsible for the server.

FIG. 1 illustrates a detailed view of an environment in which users use their client devices 110 to interact with a server 100, such as to conduct transactions with a company or other organization responsible for the server 100. For example, the server 100 can provide a network service over a network(s) 140 to the users' client devices 110 to enable users to request location-based services using their respective designated client applications. The server 100 can process the requests to identify service providers (not shown in FIG. 1 for purposes of simplicity) to provide the requested services for the users. Still further, the server 100 tracks characteristics of the users' experiences with the services and evaluates actions or non-actions of the users after the provision of the services to determine the users' likely degree of satisfaction with the services. For the users that are determined to likely be dissatisfied, the server 100 can communicate with those users to address the possible dissatisfaction. One possible example of the environment depicted in FIG. 1 is UBER TECHNOLOGIES, INC.'s network ("UBER network"), in which users use their client devices 110 to communicate via the UBER network to arrange transportation services. In such an example, the server 100 can provide network services that enable users to operate designated client applications that execute and run on the client devices 110 in order to view information about and make requests for location-based services (e.g., transport services, delivery services, etc.).

The client device 110 can correspond to a computing device, such as a smart phone, tablet computer, laptop, or any other device that can communicate over the network 140 with the server(s) 100. Although for simplicity only one server 100 and several client devices 110 are illustrated in the environment FIG. 1, it is appreciated that there may be any number of both client devices 110 and servers 100 within the environment.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

Figure 2:
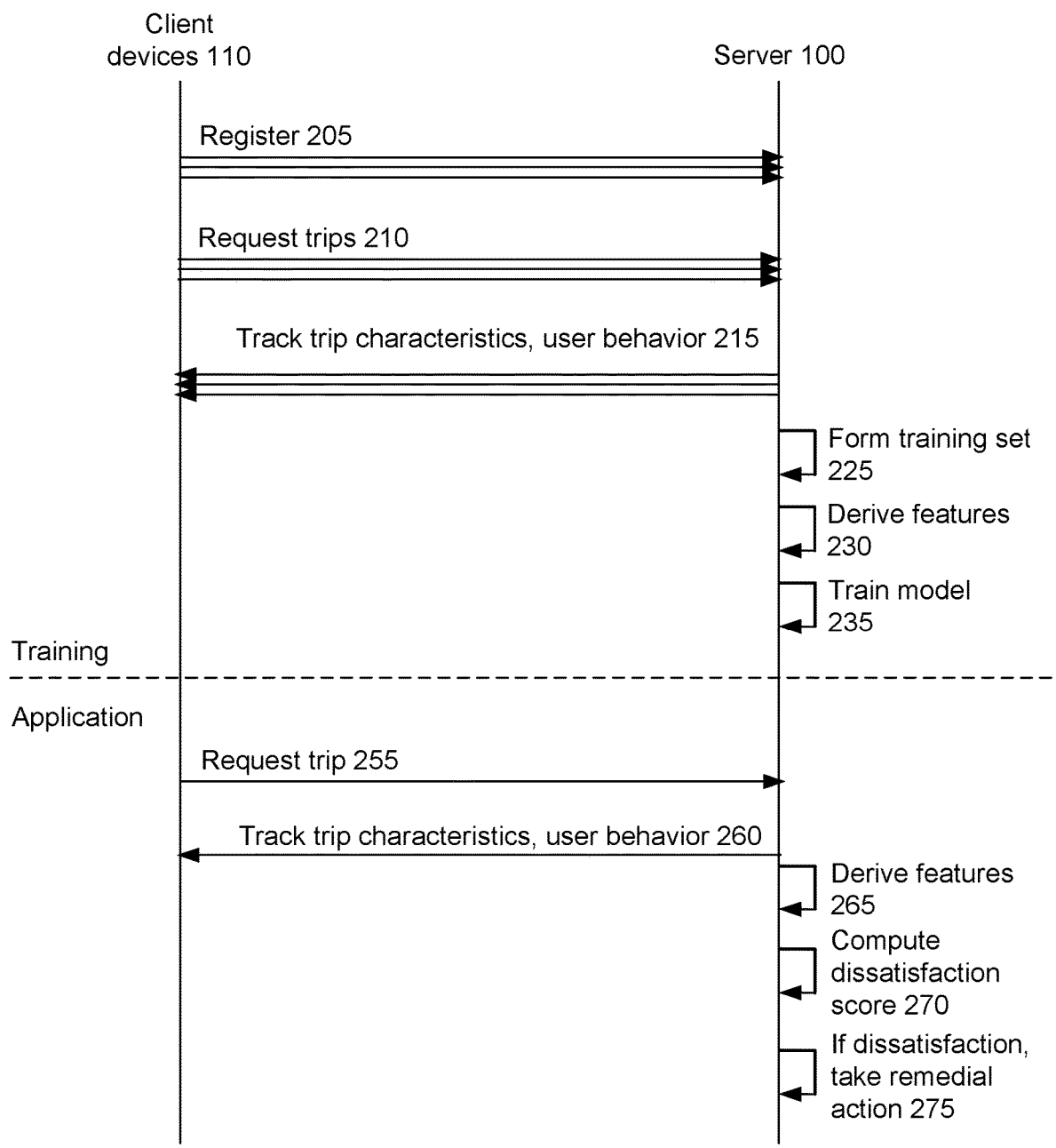
FIG. 2 illustrates actions taking place between the client devices and the server as part of the identifying of users who may cease using the server's services, according to one embodiment.

FIG. 2 illustrates actions taking place between the client devices 110 and the server 100 as part of the identifying of possibly dissatisfied users, according to one embodiment.

In one embodiment, the users use their client devices 110 to register 205 with the server 100, e.g., by creating accounts. The use of explicitly-created user accounts, and access of the registered users to the server 100 as part of a session in which they identify themselves to the server through login, increases the ability of the server 100 to associate the users with the actions taken by those users, which increases the accuracy of the training of later steps.

Initially, the server 100 may lack information that allows it to distinguish between different instances of provided transportation (hereinafter "trips")—such as rides provided to a user, or transportation of property of the user—with respect to how users will perceive their quality. In the case of one or more trips having low perceived quality, the organization responsible for the server 100 may wish to communicate with the associated user to address the problem, e.g., to send an apologetic message and/or some form of promotions (discounting prices on future uses of the services, e.g., 50% off the price of the next trip arranged through the server 100) or refund.

Accordingly, the server 100 obtains the data used to train a model for determining perceived trip quality. Users can request 210 transport services (e.g., trips) using the respective client applications on the client devices 110. For example, a user may request 210 a trip from a source location to a destination location, such as a ride from the user's home or current location, for example, to a particular destination location, e.g., a street address, a restaurant, a point of interest, etc. The server 100 can select a service provider (e.g., a driver that operates a provider client application on a mobile device and is available to provide the trip) to provide the trip for the user and provide information about the status of the service provider to the user's client device 110. In some examples, the server 110 can monitor the progress of the trip, e.g., from the current location of the service provider to the source location, from the source location to the destination location, etc., and can store data associated with the trip in a memory resource. Information about a trip can be stored as part of a trip entry in the memory resource, and can be associated with the user and the service provider (e.g., associated with the user's identifier and/or the service provider's identifier). In one example, the server 100 tracks 215 characteristics of the trips as they are requested and carried out (e.g., being performed by the service providers), writing the characteristics to storage for later analysis. "Features" characterizing the trips are later derived, directly or indirectly, from the logged characteristics, as explained below. As an addition or an alternative, the server 100 can determine 215 characteristics of the trips by analyzing the trip entries after completion of the respective trips (e.g., as part of post-trip processing operations).

The server 100 forms 225 a training set(s) of trips based on known reactions of users to the trips. In one embodiment, the server 100 identifies users that have ceased using the services of the server for at least some threshold amount of time (e.g., have not requested a trip for at least 4 weeks since the last trip), and/or those that have not ceased using the services. A set or sequence of some or all of the trips that led up to a user's cessation of services (e.g., the last N trips before the beginning of the period of cessation, such as N=11 trips) form a first training set (e.g., the positive training set), and a sequence of some or all of the trips that did not lead up to a user's cessation of services form a second training set (e.g., the negative training set).

Server 100 determines or derives 230 features for each trip of the training sets based on the trip characteristics and/or user behavior tracked at step 215. The features indicate attributes of the trips that may be of relevance to how the users perceive the trips and (by extension) whether the users are likely to cease using the services based on the trips. In one embodiment, the features include the following:

Price charged for the trip: Higher than usual prices are likely to lead to user dissatisfaction. In one embodiment, the degree to which the price charged to a user is "high" is determined with respect to the P90 of the previous trip prices charged to the user. ("PN" is a statistical measure denoting the value of a distribution such that N % of the distribution values are greater than that value.) In other embodiments, the degree to which the price charged to a user is "high" is determined with respect to an average across some set of users. In some embodiments, the degree to which the price charged to a user is "high" is based in part of the extent to which the price charged was increased due to unusual circumstances, such as a large volume of travel/low amount of available transportation at the time of the trip, extremely late or otherwise unusual time of travel, or the like.

Waiting time: The longer the amount of waiting time between the requesting of the trip and the commencement of the trip, the more the user is likely to be dissatisfied.

Divergence between estimated time of arrival and actual time of arrival: As the actual time of arrival becomes larger than the estimate time or arrival, the user is more likely to be dissatisfied.

Distance from user to trip commencement location: If the user is requesting a ride, the further the vehicle in which the user obtains the ride stops from the user—thereby requiring the user to walk or otherwise travel before the ride can begin—the more likely the user is to be dissatisfied.

Trip congestion/speed: Users tend to become frustrated if the trip is very slow, e.g., due to traffic congestion. In some embodiments, the degree of trip congestion is computed with respect to the duration of previous (e.g., average) trips along the same trip route (e.g., for that same user, or for all or some users).

Driver cancellation: Users are more likely to be dissatisfied with a trip if the driver canceled the requested trip. In one embodiment, the driver cancellation feature is quantified based on the length of the wait before driver cancellation (given that longer waits prior to cancellation are likely to lead to more user frustration).

User cancellation: User cancellation of a trip also indicates that the user is likely to be dissatisfied with the trip. In one embodiment, the user cancellation feature is quantified based on the length of the wait before user cancellation (given that longer waits prior to cancellation are likely to lead to more user frustration).

User-driver contact: The amount of contact between the driver and the user is quantified, e.g., as a number of messages exchanged via a software application used for arranging the trips.

Driver rating: The lower the rating of the driver, the more likely the user is to be dissatisfied. In one embodiment, the driver rating is averaged over all trips for that driver by all users.

Express features: Users may also provide express feedback about a particular trip, such as assigning it a particular rating (e.g., 4 of 5 stars), or providing textual feedback (e.g., "The car was clean, but the driver was rude"). In one embodiment, features expressly provided by users are given additional weight relative to features not expressly provided.

It is appreciated that in other embodiments, other features may alternatively and/or additionally be used.

In one embodiment, each of the features is quantified for (a) the last trip of each of the sets of the last N trips, and (b) a function (e.g., average or aggregate) of all N trips. For example, the feature "Waiting time" could be computed for a particular set of N trips leading up to cessation of usage as (a) 35 minutes for the last trip, and (b) average of 5 minutes for all N trips. In another embodiment, each of the N trips in the set has its own corresponding feature value for each of the analyzed features, with the values of the features for each of the N trips being weighted according to recency, with the last trip before the cessation having the highest weight, and the Nth trip having the lowest weight.

The server 100 uses machine learning to train 235 a dissatisfaction prediction model based on the features derived for the users of the training set. The trained dissatisfaction prediction model outputs, for a given set of the N most recent trips, a dissatisfaction score indicating how dissatisfied the given user is likely to be by the transportation service, and hence how likely the user will be to cease using the service. In one embodiment, the server 100 uses gradient boosting, producing an influence prediction model with 500 trees of depth 3. Other embodiments employ other training algorithms, such as logistic regression, random forest, naïve Bayes, Bayesian networks, or artificial neural networks.

It is appreciated that the steps 205-235 can be repeated many times, and the training 235 thus performed at many different times to update the dissatisfaction prediction model as new data is obtained.

With the model(s) having been trained 235 from the training set of trips during a training phase, the server 100 uses the model to predict, for the most recent N trips of any user (not just users of the training set) how likely to be dissatisfied by those N trips the user is likely to be. Thus, whenever a user completes a trip, and has at least N−1 prior trips, the server 100 can immediately apply the dissatisfaction prediction model in real time to determine whether the user is likely dissatisfied with the experience of the last N trips.

Specifically, a user requests 255 a trip, and the server 100 tracks 260 characteristics of the trip and user behavior with respect to the trip, as in steps 210 and 215. When the trip completes, the server 100 determines whether the user is likely to be dissatisfied. To do so, the server 100 derives 265 feature values from the sequence of the last N trips of the user in the same manner as in step 230. Using the feature values, the server 100 computes 270 a dissatisfaction score for the user by providing the feature as input to the computed dissatisfaction model.

If the dissatisfaction score is sufficiently great (e.g., the dissatisfaction score is greater than or equal to a threshold score), indicating at least some threshold likelihood that the user is dissatisfied enough with the service that the user will cease to use the service for at least some period of time, the server 100 takes 275 a remedial action. In some embodiments the remedial action comprises sending a message to the user about the user's experience, e.g., apologizing for the possible low quality of the recent trips. In one such embodiment, the server 100 analyzes the feature values derived for each of the last N trips to identify the likely cause of the probable user dissatisfaction. For example, if the most recent trip had an unusually large value for the trip waiting time, the server 100 might identify trip waiting time as one of the factors contributing to possible user dissatisfaction and include in the message to the user a reference to the trip waiting time (e.g., "We're sorry that you had to wait such a long time for your last ride.") In some embodiments, the remedial action comprises offering a promotion or a rebate, such as offering the next trip at a discount or for no charge.

In one embodiment, when deciding whether to take 275 a remedial action, the server 100 further takes into account a value estimate for the user. The user value estimate for a user represents some measure of a monetary value that the user will provide. For one embodiment in which the server 100 is directed to supporting the arranging of trips, the user value estimate is defined as:

$$(P90\_trips\_per\_week - rolling\_average\_current\_trips\_per\_week) \times average\_trip\_fare$$

where (for the user in question) "P90_trips_per_week" is the statistical P90 value of the number of trips taken each week, "rolling_average_current_trips_per_week" is the average number of trips per week for some recent time period, and "average_trip_fare" is the average amount paid by the user for the trips. In these embodiments, the server 100 takes remedial action based on both the user dissatisfaction score and the user value estimate, with larger user dissatisfaction scores, and larger user value estimates, tending to make it more likely that the server 100 will take remedial action.

It is appreciated that the interactions and entities illustrated in FIG. 2 could differ in different embodiments. For example, the operations 225-235 could be performed on a system other than a server 100. As another example, the registrations of step 205 need not take place provided that the trips from which features are derived at step 230 can be associated in some other way with particular users (e.g., with cookies and machine identifiers of anonymous users).

Figure 3:
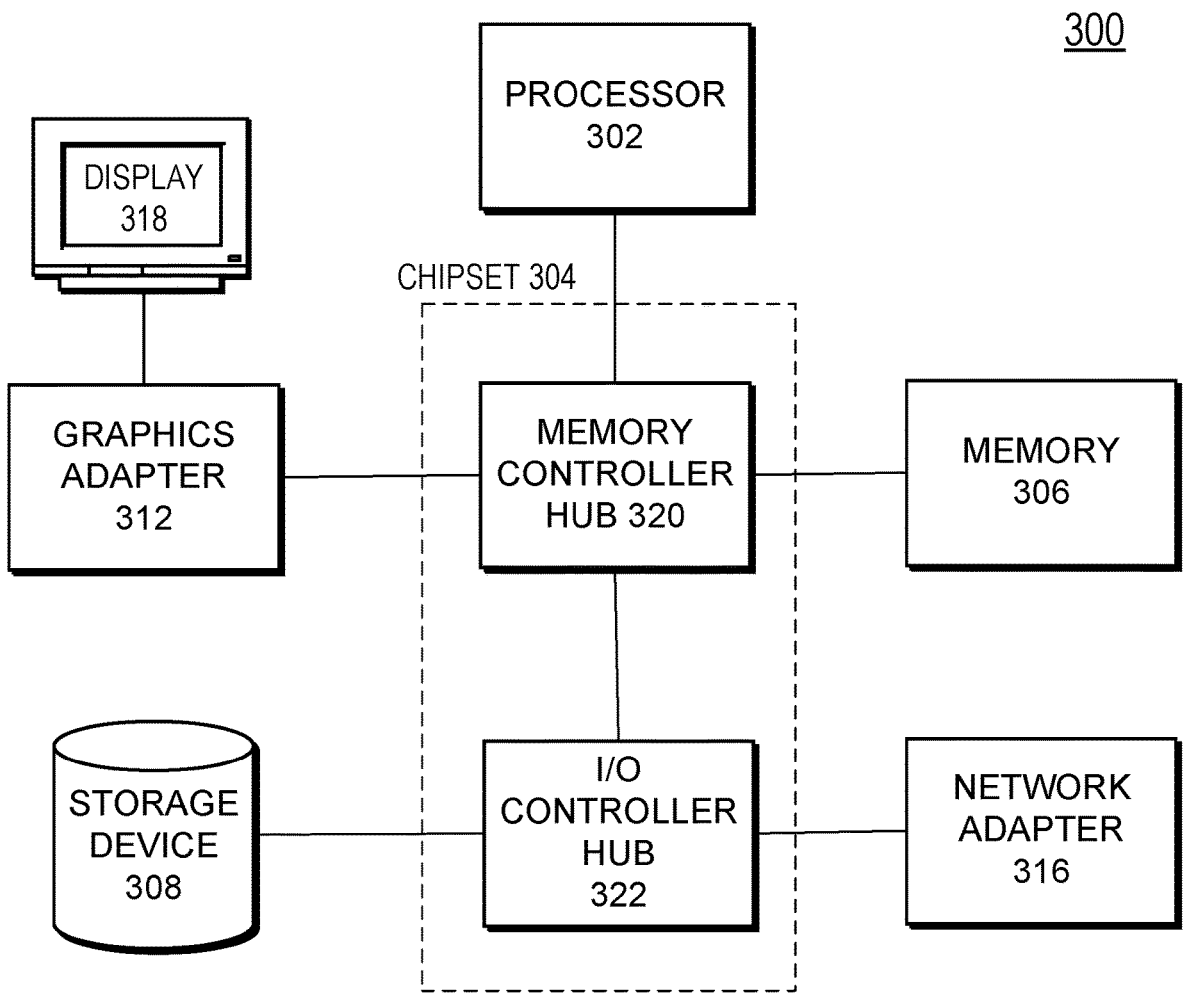
FIG. 3 is a high-level block diagram illustrating physical components of a computer used as part or all of the server or client device from FIG. 1, according to one embodiment.

FIG. 3 is a high-level block diagram illustrating physical components of a computer 300 used as part or all of the server 100 or client device 110 from FIG. 1, according to one embodiment. Illustrated are at least one processor 302 coupled to a chipset 304. Also coupled to the chipset 304 are a memory 306, a storage device 308, a graphics adapter 312, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The graphics adapter 312 displays images and other information on the display 318. The network adapter 316 couples the computer 300 to a local or wide area network.

As is known in the art, a computer 300 can have different and/or other components than those shown in FIG. 3. In addition, the computer 300 can lack certain illustrated components. In one embodiment, a computer 300 such as a server or smartphone may lack a graphics adapter 312, and/or display 318, as well as a keyboard or pointing device. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
    determining characteristics of trips of a plurality of users of a transportation service;
    determining, after completion of the trips, a set of users of the plurality of users that have ceased using the transportation services for at least a threshold period of time after the completion;
    training a prediction model based on trip sequences associated with users who have ceased using the transportation services for at least the threshold period of time, the training comprising deriving, for each trip of a plurality of trips of trip sequences of the users who have ceased using the transportation service, trip features comprising:
        divergences between estimated time of arrival and actual time of arrival, and
        at least one of: data indicating whether a driver associated with the trip canceled the trip, or data indicating whether a user associated with the trip canceled the trip;
    obtaining a first user dissatisfaction score for a first user using the prediction model and a recent set of trips for the first user;
    determining that the first user dissatisfaction score indicates that the first user is dissatisfied with the recent set of trips; and
    responsive at least in part to determining that the first user dissatisfaction score indicates that the first user is dissatisfied with the recent set of trips, performing a remedial action with respect to the first user.

2. The computer-implemented method of claim 1, wherein the trip features comprise prices charged for the trips.

3. The computer-implemented method of claim 1, wherein the trip features comprise trip waiting times.

4. The computer-implemented method of claim 1, wherein the trip features comprise distances from users to trip commencement locations.

5. The computer-implemented method of claim 1, wherein the trip features comprise degrees of congestion of the trips.

6. The computer-implemented method of claim 1, wherein the trip features comprise ratings of drivers of the trips.

7. The computer-implemented method of claim 1, wherein the trip features comprise express feedback about the trips from the users.

8. The computer-implemented method of claim 1, further comprising computing a value estimate for the first user, wherein performing the remedial action with respect to the first user is responsive at least in part to the value estimate for the first user.

9. The computer-implemented method of claim 8, wherein determining the value estimate for the first user comprises computing a function of average number of purchases by the first user and an average purchase price of purchases by the first user.

10. The computer-implemented method of claim 1, wherein the remedial action comprises sending a promotion or rebate to the first user.

11. A non-transitory computer-readable storage medium storing instructions executable by a processor, the instructions comprising:
    instructions for determining characteristics of trips of a plurality of users of a transportation service;
    instructions for determining, after completion of the trips, a set of users of the plurality of users that have ceased using the transportation services for at least a threshold period of time after the completion;
    instructions for training a prediction model based on trip sequences associated with users who have ceased using the transportation services for at least the threshold period of time, the training comprising deriving, for each trip of a plurality of trips of trip sequences of the users who have ceased using the transportation service, trip features comprising:
        distances from users to trip commencement locations, and
        at least one of: data indicating whether a driver associated with the trip canceled the trip, or data indicating whether a user associated with the trip canceled the trip;
    instructions for obtaining a first user dissatisfaction score for a first user using the prediction model and a recent set of trips for the first user;
    instructions for determining that the first user dissatisfaction score indicates that the first user is dissatisfied with the recent set of trips; and
    instructions for, responsive at least in part to determining that the first user dissatisfaction score indicates that the first user is dissatisfied with the recent set of trips, performing a remedial action with respect to the first user.

12. The non-transitory computer-readable storage medium of claim 11, wherein the trip features for the users comprise prices charged for the trips.

13. The non-transitory computer-readable storage medium of claim 11, wherein the trip features comprise trip waiting times.

14. The non-transitory computer-readable storage medium of claim 11, wherein the trip features comprise divergences between estimated time of arrival and actual time of arrival.

15. The non-transitory computer-readable storage medium of claim 11, further comprising computing a value estimate for the first user, wherein performing the remedial action with respect to the first user is responsive at least in part to the value estimate for the first user.

16. A computer-implemented method comprising:
   determining characteristics of trips of a plurality of users of a transportation service;
   determining, after completion of the trips, a set of users of the plurality of users that have ceased using the transportation services for at least a threshold period of time after the completion;
   training a prediction model based on trip sequences associated with users who have ceased using the transportation services for at least the threshold period of time, the training comprising deriving, for each trip of a plurality of trips of trip sequences of the users who have ceased using the transportation service, trip features comprising:
      distances from users to trip commencement locations, and
      at least one of: data indicating whether a driver associated with the trip canceled the trip, or data indicating whether a user associated with the trip canceled the trip;
   obtaining a first user dissatisfaction score for a first user using the prediction model and a recent set of trips for the first user;
   determining that the first user dissatisfaction score indicates that the first user is dissatisfied with the recent set of trips; and
   responsive at least in part to determining that the first user dissatisfaction score indicates that the first user is dissatisfied with the recent set of trips, performing a remedial action with respect to the first user.

\* \* \* \* \*